United States Patent
Okajima

(10) Patent No.: US 6,913,742 B2
(45) Date of Patent: Jul. 5, 2005

(54) PROCESS FOR THE PURIFICATION OF INORGANIC SALT CONTAINING ORGANIC MATERIAL AND PURIFIED SALT FOR ELECTROLYSIS OF SODIUM CHLORIDE

(75) Inventor: Kengo Okajima, Yamaguchi (JP)

(73) Assignee: Tosoh Corporation, Shinnanyo (JP)

(*) Notice: Subject to any disclaimer, the term of this patent is extended or adjusted under 35 U.S.C. 154(b) by 336 days.

(21) Appl. No.: 09/848,318

(22) Filed: May 4, 2001

(65) Prior Publication Data

US 2001/0053345 A1 Dec. 20, 2001

(30) Foreign Application Priority Data

May 8, 2000 (JP) ............................. 2000-139393
Apr. 2, 2001 (JP) ............................. 2001-103060

(51) Int. Cl.$^7$ ............................................. C01D 3/14
(52) U.S. Cl. ................................. 423/499.5; 423/499.4
(58) Field of Search ...................... 423/499.4, 499.5, 423/245.1

(56) References Cited

U.S. PATENT DOCUMENTS

| 3,565,700 A | | 2/1971 | Root |
| 3,840,651 A | | 10/1974 | Ireland |
| 4,415,460 A | * | 11/1983 | Suciu et al. ................. 210/754 |
| 4,443,307 A | * | 4/1984 | Moore et al. ............... 205/536 |
| 5,122,233 A | | 6/1992 | Zampieri |
| 5,543,057 A | * | 8/1996 | Whiting et al. ............. 210/721 |
| 6,641,741 B2 | * | 11/2003 | Phillips ...................... 210/710 |

FOREIGN PATENT DOCUMENTS

| DE | 38 35 418 | 4/1990 |
| DE | 40 00 311 | 7/1990 |
| JP | 57-73071 | 5/1982 |
| JP | 1-262986 | 10/1989 |
| WO | WO 90/08199 | 7/1990 |

* cited by examiner

*Primary Examiner*—Ngoc-Yen Nguyen
(74) *Attorney, Agent, or Firm*—Oblon, Spivak, McClelland, Maier & Neustadt, P.C.

(57) ABSTRACT

An object of the present invention is to provide an effective and efficient process for the treatment of an inorganic salt containing an organic material which can solve various problems with the prior art, i.e., process for purifying an inorganic salt containing an organic material to an extent such that it can be recovered and re-used from the standpoint of environmental protection and utilization of resources. An inorganic salt containing an organic material is granulated or subjected to chemical treatment (mixed with an alkali and/or oxidizing agent), and then subjected to heat treatment so that it is purified.

23 Claims, No Drawings

US 6,913,742 B2

PROCESS FOR THE PURIFICATION OF INORGANIC SALT CONTAINING ORGANIC MATERIAL AND PURIFIED SALT FOR ELECTROLYSIS OF SODIUM CHLORIDE

FIELD OF THE INVENTION

The present invention relates to a novel heat treatment process for purifying an inorganic salt containing an organic material to a high degree.

BACKGROUND OF THE INVENTION

In general, the treatment of an inorganic salt containing an organic material discharged from plants is subject to difference in treatment method or conditions used due to difference in the kind and concentration of organic material in inorganic salt and the kind and discharged amount of inorganic salt or difference in the target level of treatment.

For example, in order to treat an inorganic salt containing an organic material as it is in the form of powder, it has been tried to subject the inorganic salt powder to heat treatment on a fluidized bed, a moving bed (shaft kiln) or a rotary kiln. However, it is known that when an inorganic salt containing an organic material is subjected to heat treatment on a fluidized bed, the inorganic salt powder undergo agglomeration to form coarse particle even at temperatures lower than the melting point thereof, disabling the operation ("Kogyo Hannou Souchi" (Industrial Reaction Apparatus), Baifukan, page. 147, Feb. 25, 1984). Similarly, it is known that when an inorganic salt powder is subjected to heat treatment on a rotary kiln, the inorganic salt powder is attached to the wall of the rotary kiln at temperatures lower than the melting point thereof during the heat treatment of the inorganic salt powder, causing scaling that disables the operation. Accordingly, it is made difficult to subject an inorganic salt powder containing an organic material to heat treatment on an industrial basis.

As other treatment methods there have been attempted various methods which comprise dissolving an inorganic salt containing an organic material in water, and then selectively removing the organic material therefrom.

For example, JP-A-2-90985 (The term "JP-A" as used herein means an "unexamined published Japanese patent application") proposes a method which comprises dissolving an inorganic salt containing an organic material in water, and then adsorbing the organic material by an activated carbon column as a fixed bed. It is certain that the method proposed in the above cited patent can remove an organic material by adsorption. However, when the adsorption continues, the activated carbon is saturated with the organic material, making the treatment insufficient. Accordingly, in order to remove the organic material in a stable manner, it is necessary that adsorption and desorption be repeated, complicating the operation.

Another proposal is a biological treatment method which comprises dissolving an inorganic salt containing an organic material in water, and then converting the organic material to a harmless material such as carbon dioxide gas and water via activated sludge. This method is advantageous in environmental protection. However, when the concentration of inorganic salt in the aqueous solution increases, the activated sludge can no longer be alive, requiring that the operation be carried out at a lowered concentration of inorganic salt and hence raising the amount of the liquid to be treated. Further, the treatment by activated sludge proceeds at a reduced rate and requires the use of large-sized facilities that need a large installation area. Moreover, it is necessary that the conditions optimum for the living of activated sludge be maintained, complicating the operation control.

A further proposal for treatment method is a chemical treatment method which comprises adding an oxidizing agent to an aqueous solution of inorganic salt containing an organic material so that the organic material is converted to an environmentally harmless material such as carbon dioxide gas and water. The treatment method thus proposed can be operated at a raised rate by raising the temperature or the concentration of oxidizing agent. However, the treatment method is disadvantageous in that it requires the addition of a chemical in an amount substantially proportional to the amount of the organic material. Thus, the treatment of an inorganic salt containing an organic material in a high concentration adds to cost. Further, it is difficult to control the amount of the oxidizing agent to be added according to the variation of the concentration of the organic material. Thus, this proposal is impractical.

SUMMARY OF THE INVENTION

An object of the present invention is to provide an effective and efficient process for the treatment of an inorganic salt containing an organic material which can solve various problems with the prior art, i.e., process for purifying an inorganic salt containing an organic material to an extent such that it can be recovered and refused from the standpoint of environmental protection and utilization of resources.

The inventors made extensive studies of process for the purification of an inorganic salt containing an organic material. As a result, a novel fact was found that when a powdered inorganic salt containing an organic material which has been granulated or chemically treated, that is, mixed with an alkali and/or oxidizing agent is then subjected to heat treatment, the inorganic salt can be effectively and efficiently purified to a high degree. The present invention has thus been worked out.

In other words, the present invention lies in a process for the purification of an inorganic salt containing an organic material which comprises granulating or chemically treating (mixing with an alkali and/or oxidizing agent) a powdered inorganic salt containing an organic material, and then subjecting the material to heat treatment.

The aforementioned object of the present invention is attained by the following embodiments (1) to (29).

(1) A process for the purification of an inorganic salt containing an organic material which comprises granulating or chemically treating a powdered inorganic salt containing an organic material, and then subjecting the material to heat treatment.

(2) The process for the purification of an inorganic salt containing an organic material as described in (1), wherein the density of said granulated powder of inorganic salt containing an organic material is not lower than 70% of the true density of inorganic salt in said inorganic salt containing an organic material.

(3) The process for the purification of an inorganic salt containing an organic material as described in (1) or (2) wherein the average equivalent sphere diameter of said granulated powder of inorganic salt containing an organic material is from 1 to 100 mm.

(4) The process for the purification of an inorganic salt containing an organic material as described in any one of (1) to (3), wherein the crushing strength of said granulated powder of inorganic salt containing an organic material is from not lower than 5 kg.

(5) The process for the purification of an inorganic salt containing an organic material as described in any one of (1) to (4), wherein the heat treatment temperature is not lower than 400° C.

(6) The process for the purification of an inorganic salt containing an organic material as described in any one of (1) to (5), wherein the heat treatment temperature is not higher than the melting point of the inorganic salt in said inorganic salt containing an organic material.

(7) The process for the purification of an inorganic salt containing an organic material as described in any one of (1) to (6), wherein the heat treatment involves the use of a rotary kiln.

(8) The process for the purification of an inorganic salt containing an organic material as described in any one of (1) to (7), wherein the heat treatment is effected on a moving bed (shaft kiln).

(9) The process for the purification of an inorganic salt containing an organic material as described in any one of (1) to (8), wherein the inorganic salt in said inorganic salt containing an organic material comprises a halide of alkaline metal and/or halide of alkaline earth metal.

(10) The process for the purification of an inorganic salt containing an organic material as described in any one of (1) to (8), wherein the inorganic salt in said inorganic salt containing an organic material is sodium chloride.

(11) The process for the purification of an inorganic salt containing an organic material as described in (10), wherein said sodium chloride is one containing ethylenamine produced by a dichloroethane process for the preparation of ethylenamine which comprises reacting dichloroethane with ammonia to produce an ethylenamine compound.

(12) The process for the purification of an inorganic salt containing an organic material as described in (10), wherein said sodium chloride is one produced as a by-product by a process for the production of epichlorohydrin.

(13) The process for the purification of an inorganic salt containing an organic material as described in any one of (1) to (12), wherein the powder of inorganic salt containing an organic material which has been granulated and heat-treated is dissolved in water, and then filtered.

(14) A purified salt for electrolysis of sodium chloride obtained by a process for the purification of an inorganic salt containing an organic material as described in any one of (1) to (13) wherein the inorganic salt in said inorganic salt containing an organic material is sodium chloride.

(15) The process for the purification of an inorganic salt containing an organic material as described in (1), wherein said chemical treatment involves the mixing of said inorganic salt containing an organic material with an alkali and/or oxidizing agent.

(16) The process for the purification of an inorganic salt containing an organic material as described in (15), wherein said alkali comprises a hydroxide of alkaline metal and/or hydroxide of alkaline earth metal.

(17) The process for the purification of an inorganic salt containing an organic material as described in (16), wherein said alkali is at least one selected from the group consisting of lithium hydroxide, sodium hydroxide and potassium hydroxide.

(18) The process for the purification of an inorganic salt containing an organic material as described in any one of (15) to (17), wherein the heat treatment temperature is not lower than 200° C.

(19) The process for the purification of an inorganic salt containing an organic material as described in any one of (15) to (18), wherein the heat treatment temperature is not higher than the melting point of the inorganic salt in said inorganic salt containing an organic material.

(20) The process for the purification of an inorganic salt containing an organic material as described in any one of (15) to (19), wherein the heat treatment involves the use of a rotary kiln.

(21) The process for the purification of an inorganic salt containing an organic material as described in any one of (15) to (19), wherein the heat treatment is effected on a fluidized bed.

(22) The process for the purification of an inorganic salt containing an organic material as described in any one of (15) to (19), wherein the heat treatment is effected on a moving bed (shaft kiln).

(23) The process for the purification of an inorganic salt containing an organic material as described in any one of (15) to (22), wherein said powder of inorganic salt containing an organic material is mixed with an alkali and/or oxidizing agent, and then granulated.

(24) The process for the purification of an inorganic salt containing an organic material as described in any one of (15) to (22), wherein the inorganic salt in said inorganic salt containing an organic material comprises a halide of alkaline metal and/or halide of alkaline earth metal.

(25) The process for the purification of an inorganic salt containing an organic material as described in any one of (15) to (23), wherein the inorganic salt in said inorganic salt containing an organic material is sodium chloride.

(26) The process for the purification of an inorganic salt containing an organic material as described in (25), wherein said sodium chloride is one containing ethylenamine produced by a dichloroethane process for the preparation of ethylenamine which comprises reacting dichloroethane with ammonia to produce an ethylenamine compound.

(27) The process for the purification of an inorganic salt containing an organic material as described in (25), wherein said sodium chloride is one produced as a by-product by a process for the production of epichlorohydrin.

(28) The process for the purification of an inorganic salt containing an organic material as described in any one of (15) to (27), wherein the powder of inorganic salt containing an organic material which has been heat-treated is dissolved in water, and then filtered.

(29) A purified salt for electrolysis of sodium chloride obtained by a process for the purification of an inorganic salt containing an organic material as described in any one of (15) to (28), wherein the inorganic salt in said inorganic salt containing an organic material is sodium chloride.

DETAILED DESCRIPTION OF THE INVENTION

The present invention will be further described hereinafter.

(Process which comprises granulating a powdered inorganic salt containing an organic material, and then subjecting the material to heat treatment)

The term "powdered inorganic salt containing an organic material" as used herein is meant to indicate a powder of inorganic salt having an organic material present in the interior thereof and/or on the surface thereof. The inorganic salt to be used herein is not specifically limited. Examples of such an inorganic salt include halide of alkaline metal, alkaline earth metal and ammonium, sulfate of alkaline metal, alkaline earth metal and ammonium, nitrate of alkaline metal, alkaline earth metal and ammonium, hydroxide of alkaline metal, alkaline earth metal and ammonium, carbonate of alkaline metal, alkaline earth metal and ammonium, and phosphate of alkaline metal, alkaline earth metal and ammonium. Preferred among these inorganic salts are compounds which can be easily granulated and undergo neither decomposition nor reaction during heat treatment, e.g., chloride of lithium, sodium, potassium, magnesium, calcium, strontium and barium, bromide of lithium, sodium, potassium, magnesium, calcium, strontium and barium, sulfate of lithium, sodium, potassium, magnesium, calcium, strontium and barium, hydroxide of lithium, sodium, potassium, magnesium, calcium, strontium and barium, carbonate of lithium, sodium, potassium, magnesium, calcium, strontium and barium, and phosphate of lithium, sodium, potassium, magnesium, calcium, strontium and barium. Even more desirable among these compounds are compounds which are traded in a great amount, of great value as natural resources allowing effective utilization of natural resources and soluble in water. Examples of these compounds include lithium chloride, sodium chloride, potassium chloride, magnesium chloride, calcium chloride, lithium bromide, sodium bromide, potassium bromide, lithium sulfate, sodium sulfate, potassium sulfate, magnesium sulfate, lithium carbonate, sodium carbonate, and potassium carbonate. These inorganic salts may be used in the form of single compound, double salt or mixture of two or more thereof. Most desirable among these compounds is sodium chloride, particularly sodium chloride containing ethylenamine produced by a dichloroethane process for the preparation of ethylenamine which comprises reacting dichloroethane with ammonia to produce an ethylenamine compound or sodium chloride produced as a by-product by a process for the production of epichlorohydrin.

The inorganic salt for use in the present invention is in the form of powder but may contain water of crystallization, may have water attached thereto or may be in dried form. From the standpoint of granulatability and amount of heat required for heat treatment, the amount of water to be attached to inorganic salt is preferably from 0.05 to 15% by weight, more preferably from 0.1 to 10% by weight based on inorganic salt containing an organic material. The inorganic salt may be in the form of solution in a solvent such as water or powder obtained by removing the solvent from a slurry having the inorganic salt suspended therein.

The average particle diameter of the powder is not specifically limited. From the standpoint of granulatability, it is preferably from 1 $\mu$m to 1 mm, more preferably from 10 $\mu$m to 500 $\mu$m. The distribution of particle sizes is not specifically limited but may be either sharp or broad.

The organic material of the invention is not specifically limited. In practice, however, there may be used hydrocarbon compounds such as chain hydrocarbon and cyclic hydrocarbon, carbohydrates such as glucose and starch, alcohol compounds such as methanol, ethanol, ethylene glycol, propylene glycol and glycerin, phenol compounds such as phenol and hydroquinone, ether compounds such as ethyl ether, aldehyde compounds such as formaldehyde and acetaldehyde, ketone compounds such as acetone, ester compounds such as ethyl acetate, carboxylic acid compounds such as formic acid, acetic acid and oxalic acid, organic halides such as chloroform, ethane dichloride and benzyl chloride, amine compounds such as ethylenediamine, diethylenetriamine, triethylenetetramine, piperazine, tetraethylenepentamine and methylamine, imine compounds such as pyrrolidine and piperidine, azo compounds such as azobenzene, amino acids such as glycine, lysine, phenylalanine, tryptophane and aspartic acid, and derivatives and polymers thereof. All these organic materials can be disposed off by heating. From the standpoint of ease of removal by heating, nitrogen-containing compounds and organic halides are preferred. Particularly preferred among these organic materials are amine compounds. Even more desirable among these amine compounds are ethylenamine compounds. These organic materials may be used singly or in admixture of two or more thereof.

As previously mentioned, the organic material may be present either inside or outside the crystal of inorganic salt powder. If present outside the crystal, the organic material may be dissolved in the mother liquor of inorganic salt powder to which it is attached or may be attached to the surface of the crystal. If present inside the crystal, the organic material may be interposed between crystallites or may be contained in agglomerates of primary particles of inorganic salt.

The concentration of the organic material is not specifically limited. When the concentration of the organic material is high, heating can cause the organic material to be combusted to give an energy that can be utilized. When the concentration of the organic material is low, the amount of the organic material to be removed is small. The concentration of the organic material that allows efficient removal is preferably from 10 wt-ppm to 50 wt-%, more preferably from 100 to 10,000 wt-ppm based on inorganic salt (on dry base).

It is essential in the present invention that the powdered inorganic salt containing an organic material be granulated. In accordance with the present invention, the granulation of the powdered inorganic salt containing an organic material makes it possible to remarkably enhance the efficiency of removal of organic material and hence remove the organic material and purify the inorganic salt at a lower temperature in a shorter period of time than when the powdered inorganic salt containing an organic material is subjected to heat treatment as it is.

The apparatus and conditions optimum for granulation can be properly predetermined according to the kind, average particle diameter, particle size distribution and water content of the inorganic salt and the kind and concentration of the organic material. The density and strength of the granulated material obtained by this granulating method are not specifically limited. In order to enhance the efficiency of removal of organic material by heat treatment, however, the density and strength of the granulated material are preferably higher. In some detail, the density of the granulated material is preferably not lower than 70%, more preferably not lower than 80% of the true density of the inorganic salt. The term "true density" as used herein is meant to indicate the density characteristic to the kind of the inorganic salt or the density of the porous solid excluding the void. For example, the true density of sodium chloride and potassium chloride are 2.164 g/cm$^3$ and 1.988 g/cm$^3$, respectively. The strength of the granulated material is preferably not lower than 5 kg, more preferably not lower than 10 kg as calculated in terms of crushing strength determined by a Kiyashiki's hardness meter. A granulated material having a sufficiently high density and strength can be difficultly crushed during heat treatment, facilitating the operation. Further, the efficiency of removal of organic material by heat treatment can be drastically enhanced.

Examples of the process of the granulating apparatus to be used herein include rolling granulation, granulation on fluidized bed, agitated granulation, crushed granulation, compression molding, extrusion, and melt granulation. The process of the granulating apparatus can be properly predetermined according to the kind, average particle diameter, particle size distribution and water content of the inorganic salt and the kind and concentration of the organic material. Preferred among these granulating apparatus is the compression molding machine, which can provide a granulated material having a higher density and strength at a raised productivity. A briquetting machine is optimum.

The granulation will be further described with reference to the case where a briquetting machine is used.

Examples of the form of briquette include pillow, almond, lens, and finger. Any of these forms may be used in the present invention. In practice, however, the briquette is the form of pillow or almond and has an average equivalent sphere diameter of from 1 to 100 mm from the standpoint of productivity, handleability, maintenance of shape of granulated material during heat treatment and efficiency of removal of organic material. The term "average equivalent sphere diameter" as used herein is meant to indicate the average diameter calculated in terms of sphere having the same volume as that of the geometrical shape of the granulated material. Examples of the shape and average equivalent sphere diameter of pillow-like granulated material will be given below.

| Size of granulated material | Average equivalent sphere diameter |
|---|---|
| 30 mm long × 20 mm wide ×°10 mm thick | 18 mmφ |
| 150 mm long × 100 mm wide × 50 mm thick | 90 mmφ |

A briquetting machine operates by molding under a compression (roll pressure) between two rolls. The roll pressure depends on the kind, particle diameter, particle size distribution and water content of the inorganic salt. The roll pressure is preferably predetermined such that the density of the briquette of granulated material is not lower than 70%, preferably not lower than 80% of the true density of the inorganic salt.

The present invention involves the heat treatment of an inorganic salt containing an organic material which has been granulated. Examples of the apparatus to be used in this heat treatment process include fixed bed, moving bed (shaft kiln), fluidized bed, and rotary kiln. The type of the apparatus which can be preferably used depends on the kind of inorganic material, the amount of inorganic material to be treated, the kind and concentration of organic material, the desired concentration to be reached, etc. In practice, however, the moving bed (shaft kiln) and rotary kiln are preferred. In particular, rotary kiln process is preferred because it is suitable for mass treatment and can be easily operated.

The operation of heat treatment using rotary kiln will be described in detail. Important heat treatment conditions are treatment temperature and treatment time. The heat treatment temperature is properly predetermined taking into account the kind and concentration of the organic material, the kind of the inorganic salt, the state of the organic material in the inorganic salt, and economy. The preferred heat treatment temperature is preferably not lower than 400° C., more preferably not lower than 500° C. The higher the heat treatment temperature is, the more efficiently can be heat-treated the organic material. The heat treatment temperature is preferably not higher than the melting point of the inorganic salt taking into account the partial melting of the inorganic salt, scaling, deterioration of operating efficiency, etc. More preferably, the heat treatment temperature is 30° C. lower than the melting point of the inorganic salt. Under these conditions, the removal of the organic material can be effected more efficiently. Further, no scaling occurs, and the operating efficiency can be enhanced. The rotary kiln can be of either external heating type using heat supplied from the wall of the furnace or internal combustion type (direct combustion type, direct flame type) having a burner provided in the furnace. The type of the rotary kiln can be properly predetermined according to the kind of the inorganic salt, the heat treatment temperature, etc. The internal combustion type rotary kiln may operate either on such a parallel flow basis that the direction of flow of inorganic salt and the direction of flow of gas are the same or on such a counter flow basis that the direction of flow of inorganic salt and the direction of flow of gas are opposite. In practice, however, the counter flow system is preferred from the standpoint of thermal efficiency and economy. The gas in the furnace preferably contains an oxidizing gas such as oxygen. When such an oxidizing gas is contained in the gas in the furnace, most of the organic material can be burnt away. The residence time of the inorganic salt in the rotary kiln is preferably from 1 to 200 minutes, more preferably from 5 to 100 minutes. In accordance with the process of the present invention, the efficiency of removal of organic material is so high as to reduce the treatment time. In this manner, the granulated powder of inorganic salt containing an organic material can be effectively and efficiently subjected to heat treatment, making it possible to purify the inorganic salt.

The concentration of the organic material after heat treatment can reach not higher than 50 wt-ppm, even not higher than 10 wt-ppm, more even not higher than 5 wt-ppm based on inorganic salt (dry base) as calculated in terms of TOC (total organic carbon). The inorganic salt thus purified can be again used as a chemical material or the like to make the best use of resources.

In the present invention, the inorganic salt obtained by subjecting the granulated inorganic salt containing an organic material to heat treatment may be dissolved in water which is then filtered. In this manner, water insolubles such as silica and alumina which have entered into the inorganic salt from brick and other materials constituting the apparatus during heat treatment can be removed to enhance the degree of purification. Further, the solid material which has been partially carbonized during the combustion of the organic material can be removed. Accordingly, the foregoing gas in the furnace may contain a reducing material such as hydrogen and carbon monoxide. The carbide thus produced can be removed by filtration to drastically enhance the degree of purification. In other words, the addition of dissolution in water and filtration is a preferred embodiment of implication of the present invention and characterizes the present invention. Accordingly, the inorganic salt to be dissolved in water is a preferred object of the present invention. The water for dissolving the inorganic salt thus processed therein may be industrial water or purified water or may have the same kind of salts as the inorganic salt thus processed or other salts dissolved therein. The concentration of the inorganic salt in the aqueous solution may be any value suitable for the utilization of the inorganic salt thus processed. It is preferably from 5 wt-% based on the aqueous solution to saturation, more preferably from 10 wt-% based on the aqueous solution to saturation.

The inorganic salt, if it is sodium chloride or potassium chloride, can be recovered and re-used as a material to be electrolyzed (purified salt for electrolysis) to advantage. Further, the organic material thus treated, if remained in a slight amount, can be decomposed by an oxidizing agent or adsorbed and removed by an activated carbon to purify the inorganic salt to a higher degree. In this case, oxidative decomposition and adsorption by activated carbon can be carried out in an extremely easy manner.

(Process which comprises mixing a powdered inorganic salt containing an organic material with an alkali and/or oxidizing agent, and then subjecting the material to heat treatment).

The present invention also involves the mixing of a powdered inorganic salt containing an organic material with an alkali and/or oxidizing agent followed by heat treatment. In accordance with the process according to the present invention, the efficiency of removal of organic material can be remarkably enhanced, making it possible to purify the inorganic salt to a high degree at a lower temperature in a shorter period of time. The term "powdered inorganic salt containing an organic material" as used herein is meant to indicate a powder of inorganic salt having an organic material present in the interior thereof and/or on the surface thereof. The details of the powdered inorganic salt containing an organic material are as described above. The details of the organic material, too, are as described above.

The alkali and/or oxidizing agent may be any material which can enhance the efficiency of removal of organic material during heat treatment or act as a binder for powdered inorganic salt containing an organic material to effect the granulation thereof. One or more alkalis and/or oxidizing agents may be added.

Examples of the alkali employable herein include hydroxides of alkaline metal and alkaline earth metal, oxides of alkaline metal and alkaline earth metal, and carbonates of alkaline metal and alkaline earth metal. Specific examples of hydroxides of lithium, sodium, potassium, magnesium, calcium, strontium and barium, oxides of lithium, sodium, potassium, magnesium, calcium, strontium and barium, and carbonates of lithium, sodium, potassium, magnesium, calcium, strontium and barium. Preferred among these alkalis are hydroxides of lithium, sodium, potassium, magnesium, calcium, strontium and barium, and oxides of lithium, sodium, potassium, magnesium, calcium, strontium and barium. Particularly preferred among these alkalis are hydroxides of lithium, sodium and potassium, which exert a great effect of removing organic material.

Examples of the oxidizing agent employable herein include hypohalogenous acid, salt thereof, halogenous acid, salt thereof, halogenic acid, salt thereof, perhalogenic acid, salt thereof, hydrogen peroxide, permanganate, and bichromate. Particularly preferred among these oxidizing agents are chlorates.

The alkali and/or oxidizing agent may be added in the form of solid, aqueous solution or slurry. The amount of the alkali and/or oxidizing agent to be added depends on the kind of the alkali and/or oxidizing agent to be used, the kind and concentration of the organic material, the kind of the inorganic salt, and the time and temperature of heat treatment. In practice, however, it is preferably from 0.01 to 20% by weight, more preferably from 0.1 to 10% by weight based on the weight of inorganic salt containing an organic material. The addition and mixing of the alkali and/or oxidizing agent can be accomplished by showering in a commonly used rotary vessel type mixer, fixed vessel type mixer or composite mixer the inorganic salt containing an organic material which has been just withdrawn from the separator previously mentioned with an aqueous solution of alkali and/or aqueous solution of oxidizing agent or by adding the alkali and/or oxidizing agent to the inorganic salt containing an organic material in a heat treatment apparatus described later.

The powdered inorganic salt containing an organic material to which an alkali and/or oxidizing agent has been added is then subjected to heat treatment. The heat treatment may be preceded by the granulation of the powdered inorganic salt containing an organic material. The details of the granulating apparatus to be used, the granulation conditions, the shape of granulated material, etc. are as described previously.

Examples of the apparatus to be used in this heat treatment process include fixed bed, moving bed (shaft kiln), fluidized bed, and rotary kiln. The type of the apparatus which can be preferably used depends on the kind of inorganic salt, the amount of inorganic salt to be treated, the kind and concentration of organic material, the size of inorganic salt, etc. In practice, however, the moving bed and rotary kiln are preferred. In particular, rotary kiln process is preferred because it is suitable for mass treatment and can be easily operated.

The operation of heat treatment using rotary kiln will be described in detail. Important heat treatment conditions are treatment temperature and treatment time. The heat treatment temperature is properly predetermined taking into account the kind and concentration of the organic material, the kind of the inorganic salt, the state of the organic material in the inorganic salt, the shape (powder or granulated material) of the material to be treated, etc. The preferred heat treatment temperature is preferably not lower than 200° C., more preferably not lower than 300° C. The higher the heat treatment temperature is, the more efficiently can be heat-treated the organic material. When the inorganic salt containing an organic material is in the form of granulated material, the heat treatment temperature may be not lower than 400° C., preferably not lower than 500° C. The heat treatment temperature is preferably not higher than the melting point of the inorganic salt taking into account the partial melting of the inorganic salt, scaling, deterioration of operating efficiency, etc. More preferably, the heat treatment temperature is 30° C. lower than the melting point of the inorganic salt. Under these conditions, the removal of the organic material can be effected more efficiently. Further, no scaling occurs, and the operating efficiency can be enhanced. The rotary kiln can be of either external heating type using heat supplied from the wall of the furnace or internal combustion type (direct combustion type, direct flame type) having a burner provided in the furnace. The type of the rotary kiln can be properly predetermined according to the kind of the inorganic salt, the heat treatment temperature, etc. The internal combustion type rotary kiln may operate either on such a parallel flow basis that the direction of flow of inorganic salt and the direction of flow of gas are the same or on such a counter flow basis that the direction of flow of inorganic salt and the direction of flow of gas are opposite. In practice, however, the counter flow system is preferred from the standpoint of thermal efficiency and economy. The gas in the furnace preferably contains an oxidizing gas such as oxygen. When such an oxidizing gas is contained in the gas in the furnace, most of the organic material can be burnt away. The residence time of the inorganic salt in the rotary kiln is preferably from 1 to 300 minutes, more preferably from 5 to 200 minutes. In accordance with the process of the present invention, the efficiency of removal of organic material is so high as to reduce the treatment time. In this manner, the powder of inorganic salt containing an organic material having an alkali and/or oxidizing agent incorporated therein or a granulation product thereof can be effectively and efficiently subjected to heat treatment, making it possible to purify the inorganic salt.

The concentration of the organic material after heat treatment can reach not higher than 50 wt-ppm, even not higher than 10 wt-ppm, more even not higher than 5 wt-ppm based on inorganic salt (dry base) as calculated in terms of TOC (total organic carbon). The inorganic salt thus purified can be again used as a chemical material or the like to make the best use of resources.

In the present invention, the inorganic salt obtained by subjecting the inorganic salt containing an organic material to heat treatment may be dissolved in water which is then filtered. In this manner, water insolubles such as silica and alumina which have entered into the inorganic salt from brick and other materials constituting the apparatus during heat treatment can be removed to enhance the degree of purification. Further, the solid material which has been partially carbonized during the combustion of the organic material can be removed. Accordingly, the foregoing gas in the furnace may contain a reducing material such as hydrogen and carbon monoxide. The carbide thus produced can be removed by filtration to drastically enhance the degree of purification. In other words, the addition of dissolution in water and filtration is a preferred embodiment of implication of the present invention and characterizes the present invention. Accordingly, the inorganic salt to be dissolved in water is a preferred object of the present invention. The water for dissolving the inorganic salt thus processed therein may be industrial water or purified water or may have the same kind of salts as the inorganic salt thus processed or other salts dissolved therein. The concentration of the inorganic salt in the aqueous solution may be any value suitable for the utilization of the inorganic salt thus processed. It is preferably from 5 wt-% based on the aqueous solution to saturation, more preferably from 10 wt-% based on the aqueous solution to saturation.

The inorganic salt, if it is sodium chloride or potassium chloride, can be recovered and re-used as a material to be electrolyzed (purified salt for electrolysis) to advantage. Further, the organic material thus treated, if remained in a slight amount, can be decomposed by an oxidizing agent or adsorbed and removed by an activated carbon to purify the inorganic salt to a higher degree. In this case, oxidative decomposition and adsorption by activated carbon can be carried out in an extremely easy manner.

The present invention will be further described in the following examples, but the present invention should not be construed as being limited thereto.

The total organic carbon concentration (hereinafter referred to as "TOC concentration") and total nitrogen compound concentration (hereinafter referred to as "T-N concentration") set forth in the following examples and comparative examples are based on the amount of the inorganic salt thus heat-treated. The inorganic salt was dissolved in ultrapure water. The resulting clarified solution was then analyzed by the following analyzers.

For the measurement of TOC concentration, a Type TOC-5000A total organic carbon meter produced by Shimadzu Corp. was used. For the measurement of T-N concentration, a TN-05 type total nitrogen analyzer produced by Mitsubishi Chemical Corporation was used.

EXAMPLE 1

Sodium chloride produced as a by-product by a process for the production of ethylenamine from ethane dichloride and ammonia as starting materials (hereinafter referred to as "by-product salt") contained an ethylenamine compound and water content in an amount of 0.18% by weight and 2.4% by weight, respectively. 1 t of the by-product salt was then continuously subjected to granulation by means of a briquetting machine having a roll diameter of 52 cm and a roll width of 16.5 cm. The briquettes thus obtained were in the form of pillow and exhibited a weight of about 10 g per piece, a density as high as 1.94 g/cm$^3$ and a crushing structure as high as 48 kg on the average as measured by a Kiyashiki's hardness meter.

The briquettes thus obtained were then subjected to continuous heat treatment at a burner temperature of 650° C. in an internal combustion rotary kiln (inner diameter: 300 mmφ; length: 2.9 m). The rate at which the briquettes are fed was 37 kg/hr, and the residence time in the rotary kiln was 37 minutes. Under these conditions, heat treatment was continuously effected for 2 hours. As a result, no scaling occurred in the rotary kiln. Thus, stable operation was made possible to the end. 250 g of the by-product salt which had been treated in the rotary kiln was dissolved in 750 g of purified water. The aqueous solution thus obtained was then subjected to filtration to remove carbides therefrom. The quality of the filtrate was then analyzed. As a result, an aqueous solution of sodium chloride was recovered which had been purified to a high degree such that TOC concentration was 8 wt-ppm and T-N concentration was 20 wt-ppm.

COMPARATIVE EXAMPLE 1

The same by-product salt as used in Example 1 was treated as it was in the form of ungranulated powder in an external heating rotary kiln. The inner diameter of the rotary kiln was 120 mm, the length of the heating portion was 1.5 m, and the temperature of the heating portion was 470° C. As a result, the wall of the furnace was scaled with the by-product salt, causing the by-product to reside in the rotary kiln and hence making it impossible to effect continuous treatment.

Then, the temperature of the heating portion was changed to 450° C., the by-product salt supplying rate was charged to 2.4 kg/hr, and the residence time was changed to 46 minutes. Under these conditions, continuous treatment was effected. As a result, continuous operation was made possible. 250 g of the by-product thus treated was then dissolved in 750 g of purified water. Carbides were then removed from the thus obtained aqueous solution by filtration. The quality of the filtrate was then analyzed. As a result, TOC concentration was 88 wt-ppm and T-N concentration was 124 wt-ppm, demonstrating that the treatment was insufficient.

EXAMPLE 2

500 kg of the same by-product salt as used in Example 1 was subjected to granulation by a briquetting machine to obtain pillow-type briquettes (weight: about 42 g/piece). The briquettes thus obtained exhibited a density as high as 1.91 g/cm$^3$ and a crushing strength as high as 97 kg on the average as measured by a Kiyashiki's hardness meter. 250 g (6 pieces) of the briquettes thus obtained were then subjected to heat treatment in a 550° C. electric furnace for 15 minutes. 240 g of the by-product salt thus treated was then dissolved in 720 g of purified water. Carbides were then removed from the aqueous solution. As a result, the aqueous solution exhibited TOC concentration of 8 wt-ppm and T-N concentration of 36 wt-ppm, demonstrating that the treatment was sufficient.

COMPARATIVE EXAMPLE 2

260 g of the same by-product salt as used in Example 1 was charged in a platinum crucible as it was in the form of ungranulated powder, and then subjected to heat treatment in a 550° C. electric furnace for 15 minutes. 250 g of the by-product salt thus treated was then dissolved in 750 g of purified water. Carbides were then removed from the aqueous solution. As a result, the aqueous solution exhibited TOC concentration of 120 wt-ppm and T-N concentration of 180 wt-ppm, demonstrating that the treatment was insufficient.

EXAMPLE 3

Sodium chloride produced as a by-product by a process for the production of epichlorohydrin had TOC concentration of 5,000 wt-ppm and a water content of 2 wt-%. 50 kg of the sodium chloride was then subjected to granulation by means of a briquetting machine to obtain pillow-shaped briquettes (weight: about 10 g/piece). The briquettes thus obtained exhibited a density as high as 1.9 g/cm$^3$ and a crushing structure as high as 30 kg on the average as measured by a Kiyashiki's hardness meter.

The briquettes thus obtained were then subjected to continuous heat treatment at a burner temperature of 700° C. in an internal combustion rotary kiln (inner diameter: 300 mm$\phi$; length: 2.9 m). The rate at which the briquettes are fed was 20 kg/hr, and the residence time in the rotary kiln was 50 minutes. Under these conditions, heat treatment was continuously effected for 3 hours. As a result, no scaling occurred in the rotary kiln. Thus, stable operation was made possible to the end. 300 g of the by-product salt thus treated was dissolved in 900 g of purified water. Carbides were then removed from the thus obtained aqueous solution by filtration. The quality of the filtrate was then analyzed. As a result, an aqueous solution of sodium chloride was recovered which had been purified to a high degree such that TOC concentration was 20 wt-ppm.

COMPARATIVE EXAMPLE 3

The by-product salt obtained at the epichlorohydrin production process in Example 3 was treated ungranulated in a rotary kiln. The rotary kiln used herein was of internal combustion type as in Example 3. The temperature of combustion gas was 700° C. The by-product salt was continuously fed at a rate of 20 kg/hr. However, the wall of the rotary kiln was scaled with the by-product salt, causing the amount of the by-product salt residing in the furnace to increase with time. Thus, the operation was suspended after 2 hours.

EXAMPLE 4

To 25 g of the same by-product salt powder as used in Example 1 was added 2 g of a 50 wt-% aqueous solution of sodium hydroxide. The mixture was stirred, and then entirely charged into a platinum crucible which was then subjected to heat treatment in a 450° C. electric furnace. After 1 hour, the platinum crucible was then withdrawn and allowed to cool. The salt thus treated was white. The total amount of the salt thus treated was then dissolved in 75 g of ultrapure water. The solution thus obtained was clear and contained no carbides. The quality of the aqueous solution was then analyzed. As a result, the aqueous solution exhibited TOC concentration of 4 wt-ppm and T-N concentration of 80 wt-ppm, demonstrating that the treatment at 450° C. was sufficient.

COMPARATIVE EXAMPLE 4

25 g of the same by-product salt powder as used in Example 1 was charged into a platinum crucible as it was. The platinum crucible was then subjected to heat treatment in a 450° C. electric furnace for 1 hour. The by-product salt thus treated was gray. The total amount of the by-product salt was then dissolved in 75 g of ultrapure water. As a result, fine black carbides were observed to be suspended therein. The carbides were then removed by filtration. The quality of the filtrate was then analyzed. As a result, the filtrate exhibited TOC concentration of 84 wt-ppm and T-N concentration of 92 wt-ppm, demonstrating that the treatment was insufficient.

EXAMPLE 5

To 20 kg of the same by-product salt powder as used in Example 1 was then added 0.8 kg of a 50 wt-% solution of sodium hydroxide. The mixture was then stirred and kneaded. The by-product salt powder thus obtained was then continuously subjected to heat treatment at a temperature of 400° C. in an external heating rotary kiln (inner diameter: 120 mm$\phi$; length: 1.5 m). The rate at which the by-product salt powder is fed was 0.8 kg/hr. The residence time in the rotary kiln was 2 hours. Under these conditions, heat treatment was continuously effected for 8 hours. The salt thus treated was white. 300 g of the salt thus obtained was then dissolved in 900 g of ultrapure water. The aqueous solution thus obtained was clear and contained no carbides. The quality of the aqueous solution was then analyzed. As a result, the aqueous solution exhibited TOC concentration of 24 wt-ppm and T-N concentration of 100 wt-ppm, demonstrating that the treatment was sufficient.

EXAMPLE 6

The same by-product salt powder as used in Example 1 was continuously subjected to treatment in the same external heating rotary kiln as used in Example 5. The temperature of the heating furnace was 400° C., the rate at which the by-product salt powder is fed was 0.8 kg/hr, and the residence time in the rotary kiln was 2.5 hours. Solid NaOH was continuously fed into the rotary kiln at a rate of 0.04 kg/hr at a point of 0.5 m downstream from the portion at which the by-product salt was fed into the rotary kiln. Under these conditions, the by-product salt was subjected to heat treatment while being mixed with NaOH in the rotary kiln. The by-product salt thus treated was white. 300 g of the by-product salt thus obtained was dissolved in 900 g of ultrapure water. The aqueous solution thus obtained was clear and contained no carbides. The quality of the aqueous solution was then analyzed. As a result, the aqueous solution exhibited TOC concentration of 28 wt-ppm and T-N concentration of 112 wt-ppm, demonstrating that the treatment was sufficient.

In accordance with the process of the present invention, an inorganic salt containing an organic material can be purified to a high degree, making it possible to protect environment and make the effective use of inorganic salt. Further, the inorganic salt containing an organic material can be effectively and efficiently subjected to heat treatment, making it possible to use a small-sized compact apparatus.

Further, scaling on the apparatus for the heat treatment of an inorganic salt containing an organic material can be avoided, facilitating continuous operation and hence enhancing the productivity and operation efficiency. Moreover, an inorganic salt can be purified to a high degree in a stable manner even against the variation of the organic material in the inorganic salt.

Still further, an inorganic salt containing an organic material from an ethylenamine plant can be purified to a high degree so that it can be used as a starting material for the electrolysis of sodium chloride (purified salt for electrolysis).

As mentioned above, in accordance with the process of the present invention, an inorganic salt containing an organic material can be effectively and efficiently purified.

While the invention has been described in detail and with reference to specific embodiments thereof, it will be apparent to one skilled in the art that various changes and modifications can be made therein without departing from the spirit and scope thereof.

What is claimed is:

1. A process for the purification of sodium chloride comprising at least one organic material, wherein said process comprises
   granulating a powdered sodium chloride comprising at least one organic material to obtain a granulated sodium chloride,
   and then heat treating said granulated sodium chloride,
   wherein the average equivalent sphere diameter of said granulated sodium chloride is from 1 to 100 mm.

2. The process according to claim 1, wherein the density of said granulated sodium chloride is not lower than 70% of the true density of the sodium chloride in said sodium chloride comprising at least one organic material.

3. The process according to claim 1, wherein the crushing strength of said granulated sodium chloride is not lower than 5 kg.

4. The process according to claim 1, wherein the heat treatment temperature is not lower than 400° C.

5. The process according to claim 1, wherein the heat treatment temperature is not higher than the melting point of the sodium chloride in said sodium chloride comprising at least one organic material.

6. The process according to claim 1, wherein the heat treatment comprises the use of a rotary kiln.

7. The process according to claim 1, wherein the heat treatment is carried out on a moving bed.

8. The process according to claim 1, wherein said sodium chloride comprises ethylenamine produced by a dichloroethane process for the preparation of ethylenamine which comprises reacting dichloroethane with ammonia to produce an ethylenamine compound.

9. The process according to claim 1, wherein said sodium chloride is produced as a by-product of a process for the production of epichlorohydrin.

10. The process according to claim 1, further comprising after said heat-treating:
    dissolving said granulated sodium chloride in water to form a solution A, and then filtering said solution A.

11. The process according to claim 1, further comprising chemically-treating said powdered sodium chloride comprising at least one organic material to obtain a chemically-treated and granulated sodium chloride,
    wherein said chemical treatment comprises mixing said powdered sodium chloride comprising at least one organic material with at least one alkali; or at least one oxidizing agent; or at least one alkali and at least one oxidizing agent to form a mixture.

12. The process according to claim 11, wherein said powdered sodium chloride comprising at least one organic material is mixed with at least one alkali, and wherein said alkali comprises at least one hydroxide of alkaline metal, at least one hydroxide of alkaline earth metal, or mixtures thereof.

13. The process according to claim 12, wherein said alkali is at least one selected from the group consisting of lithium hydroxide, sodium hydroxide and potassium hydroxide.

14. The process according to claim 11, wherein the heat treatment temperature is not lower than 200° C.

15. The process according to claim 11, wherein the heat treatment temperature is not higher than the melting point of the sodium chloride in said sodium chloride comprising at least one organic material.

16. The process according to claim 11, wherein said heat treatment comprises the use of a rotary kiln.

17. The process according to claim 11, wherein said heat treatment is carried out on a fluidized bed.

18. The process according to claim 11, wherein said heat treatment is carried out on a moving bed.

19. The process according to claim 11, wherein said chemically-treating is carried out before said granulating.

20. The process according to claim 11, wherein said sodium chloride comprises ethylenamine produced by a dichloroethane process for the preparation of ethylenamine which comprises reacting dichloroethane with ammonia to produce an ethylenamine compound.

21. The process according to claim 11, wherein said sodium chloride is produced as a by-product of a process for the production of epichlorohydrin.

22. The process according to claim 11, further comprising after said heat treating
    dissolving said chemically-treated and granulated sodium chloride in water to form a solution B, and then filtering said solution B.

23. The process according to claim 1, wherein the average equivalent sphere diameter of said granulated sodium chloride is from 18 mm to 90 mm.

* * * * *